A. R. SMITH.
POWER PLANT.
APPLICATION FILED DEC. 15, 1920.
1,390,062. Patented Sept. 6, 1921.
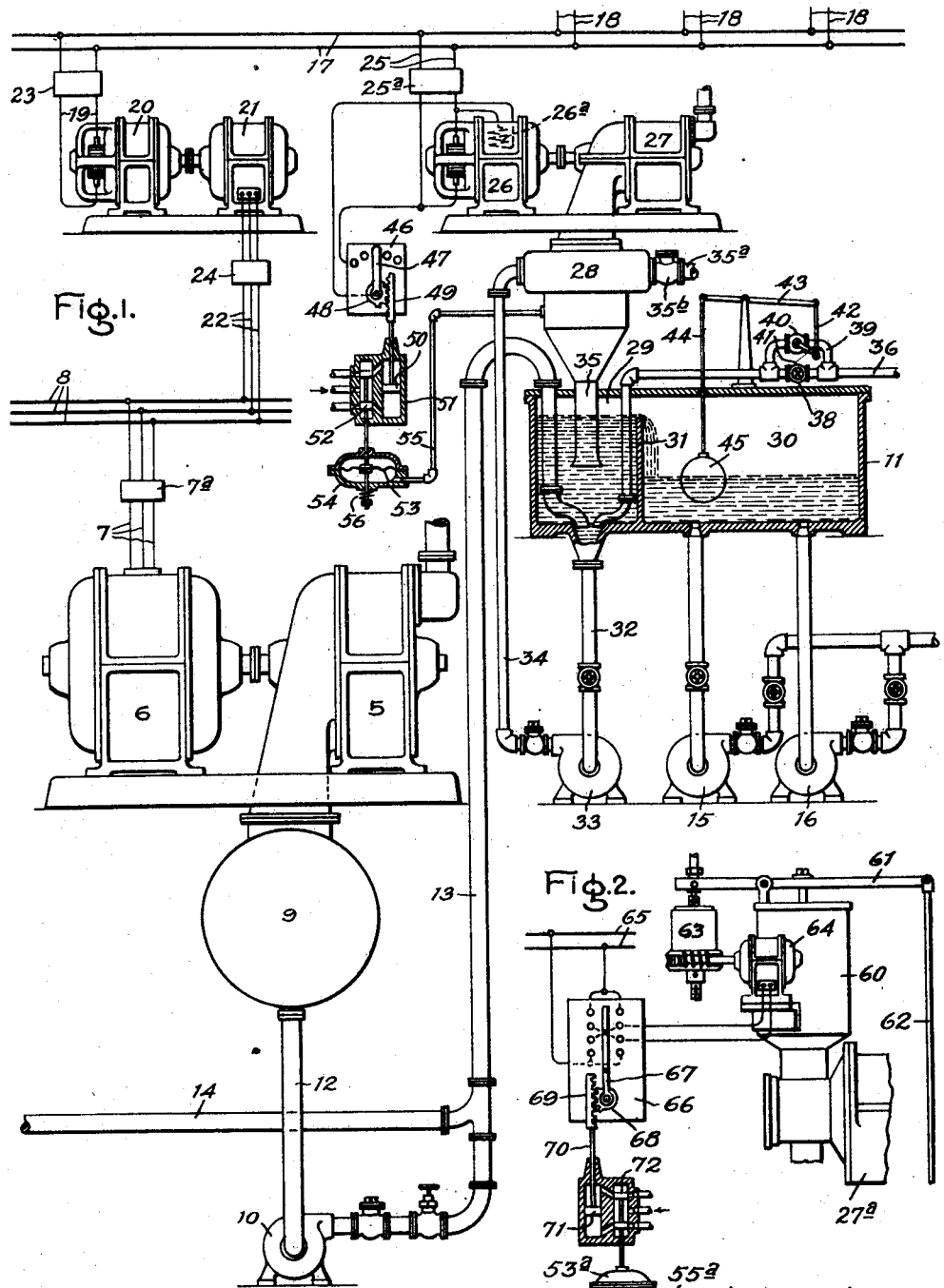
Fig.1.
Fig.2.
Inventor:
Arthur R. Smith,
by 
His Attorney.

UNITED STATES PATENT OFFICE.

ARTHUR R. SMITH, OF SCHENECTADY, NEW YORK, ASSIGNOR TO GENERAL ELECTRIC COMPANY, A CORPORATION OF NEW YORK.

POWER PLANT.

1,390,062.  Specification of Letters Patent.  Patented Sept. 6, 1921.

Application filed December 15, 1920. Serial No. 430,861.

*To all whom it may concern:*

Be it known that I, ARTHUR R. SMITH, a citizen of the United States, residing at Schenectady, in the county of Schenectady, State of New York, have invented certain new and useful Improvements in Power Plants, of which the following is a specification.

The present invention relates to power plants wherein electric generators driven by prime movers are employed for generating power. The prime movers now in general use are steam turbines and in the following description I describe my invention as carried out in connection with steam turbogenerator sets. It will be understood, however, that this is only by way of example and that other types of prime movers may be utilized if found desirable.

In power plants there are a number of small auxiliary devices, such as circulating pumps, fans, blowers, etc. to be driven and my invention relates particularly to plants wherein such auxiliaries are driven by electric motors, a small turbo-generator set, termed a "house turbine" being provided for furnishing power to such motors, the exhaust from the house turbine being utilized to heat the feed water. As is well understood, the feed water comprises the condensate from the main turbo-generator set plus the required amount of make-up water.

The use of a so-termed "house turbine" for furnishing power for driving the auxiliaries, rather than taking such power from the main unit, is desirable because when excessive reductions in voltage or frequency occur, as would be caused for example in the case of a short circuit, the "house turbine" will keep the auxiliaries in operation thus preventing a shutting down of the whole power plant. In other words, the house turbine forms a reliable source of power for the auxiliaries independent of the main unit.

With such a system I have found that the greatest economy in operation occurs when such a portion of the auxiliary load is carried by the house turbine as to cause the turbine to furnish sufficient exhaust steam to heat the feed water to a certain or predetermined temperature, the remainder of the auxiliary load being carried by the main power unit. This temperature may vary for different plants but is a thing which can be determined by calculation.

According to my invention, I provide an automatic controlling means for the house turbine whereby the load on it will be so regulated that the exhaust from it will be just sufficient to heat the feed water to the desired temperature, the remainder of the auxiliary load being carried by the main unit, the arrangement being such that the auxiliary load will be automatically shifted from the house turbine to the main unit and back again as the requirements for exhaust steam vary. For automatically controlling the house turbine I preferably provide an arrangement responsive to the exhaust pressure of the house turbine and which operates to maintain such exhaust pressure constant or substantially constant. The generator of the house turbine set is connected to bus-bars from which leads extend to the motors of the auxiliaries, and the generator of the main set is likewise connected to such bus-bars either directly or through the medium of a motor generator set, transformer or the like, according to the requirements of the particular system. The two generators are thus connected to the auxiliary load in parallel.

In the drawing, Figure 1 shows diagrammatically a power plant embodying my invention, and Fig. 2 illustrates a modification.

Referring to the drawing, 5 indicates a main turbine driving a generator 6 which is electrically connected by leads 7 to busbars 8. In leads 7 is a suitable circuit breaker 7$^a$. The exhaust end of the turbine is connected to a condenser 9 and condensate from the condenser is pumped by a pump 10 to a hot well 11. The suction side of pump 10 is connected to condenser 9 by a pipe 12 and the discharge side of the pump is connected to the hot well by a pipe 13. A power plant may have a single main turbo-generator unit or it may have two or more connected in parallel or otherwise, and at 14 I have indicated a pipe which may lead from the condenser of another main unit and discharge into the hot well through pipe 13 also. At 15 and 16 are feed water pumps which pump water from hot well 11 to the boilers of the power plant (not shown) and as is well understood this feed water may be passed through economizers prior to being fed into the boilers so as to have its temperature raised still higher.

The bus-bars from which power is taken to drive the auxiliaries are indicated at 17 and the leads indicated at 18 extend to the motors which drive the various auxiliary devices. For example, some of them may be leads connecting to the motors which drive pumps 10, 15, and 16.

Power for driving the auxilaries is supplied to bus-bars 17 from a house turbine set and from the main turbo-generator set which are connected to bus-bars 17 in parallel. In the present instance it has been assumed that the auxiliaries are driven by direct current motors and that the main generator 6 is an alternating current generator. Generator 6 is accordingly connected to bus-bars 17 through the intermediary of a motor generator set. Leads 19 connect the generator 20 of the motor generator set to bus-bars 17, the motor 21 of the set being connected to bus-bars 8 by leads 22. The motor generator set thus takes power from bus-bars 8, i. e. the main turbo-generator unit, and delievers power to bus-bars 17. In leads 19 and 22 are suitable circuit breakers 23 and 24 respectively.

Connected to bus-bars 17 by leads 25 is a generator 26 driven by a turbine 27, such a turbo-generator set being termed a "house tubine" as stated above. In leads 25 is a suitable circuit breaker 25ª. The exhaust end of turbine 27 is connected to a jet condenser 28. Hot well 11 is divided into two compartments 29 and 30 by a partition wall 31. Compartment 29 is smaller than compartment 30 and the two are connected to each other at the top, this being effected in the present instance by making wall 31 terminate short of the top of the hot well. Leading from the bottom of compartment 29 is a pipe 32 which connects with the suction side of a pump 33. The discharge side of pump 33 is connected by a pipe 34 to the condensing or cooling water inlet of jet condenser 28. Discharge tube 35 of jet condenser 28 terminates in compartment 29 below the level of the water therein. At 35ª is an atmospheric exhaust provided with a loaded outwardly opening check valve 35ᵇ.

Pipe 13 which conveys condensate from the main condenser or condensers extends down into compartment 29 of the hot well and terminates directly adjacent the inlet end of pipe 32 so that in substance it discharges directly into such pipe. At 36 is a feed water make up supply pipe and this also extends down into compartment 29 and terminates directly adjacent the inlet end of pipe 32. It will thus be seen that the condensing or cooling water supplied by pump 33 to jet condenser 28 is the condensate from the main condenser or condensers and the feed water make-up.

Pipe 36 may lead from any suitable supply of feed water and is provided with a valve 38 around which is a by-pass pipe 39 provided with a valve 40. Valve 40 has an operating arm 41 which is connected by a link 42, lever 43, and rod 44 to a float 45. Float 45 rides on the water in compartment 30 and as the level raises or lowers it acts to shut or open valve 40. With this arrangement valve 38 is set by hand so there is supplied through it an amount of make up feed water less than the minimum required. The remainder is then supplied through valve 40. By this arrangement float 45 acts on only a fractional part of the total make up feed water and as a result a closer regulation can be obtained.

Connected in series with the field of generator 26, which field is indicated at 26ª, is a regulating resistance 46 having a contact arm 47 adapted to be moved to cut resistance in and out of the generator field. Connected to contact arm 47 is a toothed segment 48 with which meshes a rack 49 connected to a piston 50 which moves in a cylinder 51. Associated with cylinder 51 is a pilot valve 52 which controls the supply of actuating fluid to the cylinder. This forms an ordinary type of servo-motor or hydraulic motor, the operation of which is well understood. The stem of pilot valve 52 is connected to a diaphragam 53 located in a casing 54 and connected to casing 54 below the diaphragm is a pipe 55 which leads from jet condenser 28. Diaphragm 53 forms therefore a movable abutment which is subjected to the pressure existing in the condenser. At 56 is a suitable spring for adjusting the setting of the movable abutment or pressure responsive device 53, the spring shown being under tension and acting to move the diaphragm upward.

The operation is as follows:—Assume the main turbo-generator set is in operation and carrying a certain load and all auxiliaries are in operation. Also that the pressure responsive device is set to hold a certain exhaust pressure in condenser 28. Under these circumstances a part of the auxiliary load may be carried by the house turbine and the remainder by the motor-generator set, i. e. by the main turbo-generator set. A certain amount of the regulating resistance 46 may be in series with generator field 26ª. If now the load on the main turbo-generator set increases which means that it will require more steam and hence that there will be more condensate, such additional condensate in passing through jet condenser 28 will act to increase the vacuum created i. e., decrease the back pressure, on house turbine 27, and at the same time the temperature to which the water is heated in passing through such condenser will decrease. As a result of the increase in vacuum, diaphragm 53 will move downward thereby lowering pilot valve 52 and admitting actuating fluid beneath piston 50. This raises piston 50 and turns contact arm 47 to decrease the resistance in series with generator field 26ª and thus increases the load on the house turbine. As a result the house turbine will take more steam in order to carry such additional load which means that there will be more exhaust from it and hence the temperature to which the water passing through condenser 28 is heated will be increased and the vacuum decreased. The additional load taken by the house turbine will be taken from the motor-generator set thus decreasing the load carried by it. On the other hand, should the load on the main turbine decrease thereby decreasing the amount of condensate available for use in jet condenser 28, the vacuum in the jet condenser will decrease with the result that the pressure responsive device will operate to cut resistance into the generator field thereby decreasing the load on the turbine and increasing the load on the motor-generator set. In connection with the house turbine it will be understood of course that it is provided with the usual regulating mechanism (not shown) for supply steam in accordance with the load as is common and well known in the art. Should the main turbine 5 shut down, due, for example, to a short circuit or other cause, the circuit breaker 23 will immediately open thereby disconnecting the motor generator set from bus-bars 17. The house turbine will then carry the entire load of the auxiliaries. Upon such an occurrence the house turbine will operate non-condensing, exhausting to atmosphere through the exhaust conduit 35ª. The closing down of the whole plant is thus prevented.

It will thus be seen that the arrangement operates automatically to maintain a substantially constant exhaust pressure for the house turbine and that only sufficient load is carried by the house turbine to supply enough exhaust steam for maintaining such pressure. In other words the steam used in the house turbine is only such as will supply an amount of exhaust steam which can be efficiently utilized for heating the feed water.

Fig. 2 shows an arrangement similar to that shown in Fig. 1 except that the pressure regulator instead of operating on a resistance in series with the generator field for varying the load on the house turbine operates on the speed governor of the house turbine to vary its setting, thus accomplishing the same result. In Fig. 2, 27ª indicates the turbine of the house turbine set and 60 a speed governor which controls the admission of elastic fluid to it, the governor being connected to the regulating mechanism for admitting steam to the turbine through a governor lever 61 and a rod 62. Connected to governor lever 61 is a synchronizing spring structure indicated at 63 which is adapted to be operated to vary the setting of the governor by a motor 64. Motor 64 is connected to a suitable source of power as indicated at 65 through a reversing switch 66. Switch arm 67 of the reversing switch has connected to it a toothed segment 68 with which meshes a rack 69 carried by a rod 70. Rod 70 is connected to the piston 71 of a servo motor or hydraulic motor, the pilot valve of which is shown at 72. The stem of pilot valve 72 is connected to a movable abutment of the same character as that shown in Fig. 1 at 53, the same being indicated by the numeral 53ª. 55ª is a pipe corresponding to pipe 55 of Fig. 1 and performing the same functions, it serving to connect the movable abutment to the jet condenser of the house turbine. The operation of the arrangement shown in Fig. 2 is the same in general as that shown in Fig. 1 except that, as already stated, the regulating device which responds to the vacuum of the jet condenser acts on the turbine governor. With an increase in vacuum movable abutment 53ª will be actuated to close reversing switch 66 to effect operation of motor 66 in a direction to load the governor thereby causing the house turbine to take more load, while with a decrease in the load, the switch will be closed to operate the motor in the opposite direction to unload the governor thereby shifting some of the load from the house turbine to the motor generator set. The arrangement shown in Fig. 2 is well adapted for use in case alternating current motors are used to drive the auxiliaries although it may be used with a direct current drive. In this connection it will be understood that in case the auxiliaries are driven by alternating current motors and the main generator is an alternating current generator the connection from the main turbo-generator set to the bus-bars from which the auxiliaries are driven may be through the medium of a suitable transformer.

In accordance with the provisions of the patent statutes, I have described the principles of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. A power plant having a main prime mover driven generator set, motor driven auxilaries, and a prime mover driven generator set for supplying power to the motors of the auxilaries, characterized by the fact that condensate from the condenser for the main prime mover is used as cooling liquid in the condenser for the second named prime mover, and the temperature to which the condensate used for cooling purposes in the condenser of the second named prime mover is heated is kept substantially constant by automatically varying the load on the second named prime mover.

2. A power plant having a main prime mover driven generator set, motor driven auxiliaries, and a prime mover driven generator set for supplying power to the motors of the auxiliaries characterized by the fact that condensate from the condenser for the main prime mover is used as cooling liquid in the condenser for the second named prime mover, and the temperature to which the condensate used for cooling purposes in the condenser of the second named prime mover is heated is kept substantially constant by automatically varying the load on the second named prime mover, the remainder of the load being carried by the first named prime mover.

3. In a power plant, a main prime mover, a generator driven thereby, a second prime mover, a generator driven by it, a condenser for the second named prime mover which utilizes condensate from the first named prime mover as cooling liquid, and means for maintaining automatically such a load on the second named prime mover that its exhaust will heat the condensate used in its condenser to a predetermined temperature.

4. In a power plant, a main prime mover, a generator driven thereby, a second prime mover, a generator driven by it, a condenser for the second named prime mover which utilizes condensate from the first named prime mover as cooling liquid, and means automatically controlled by the pressure in the condenser of the second named prime mover for automatically maintaining a substantially constant pressure therein.

5. A power plant having a main prime mover driven generator set, motor driven auxiliaries, and a prime mover driven generator set and a motor generator set connected in parallel for supplying power to the motors of the auxiliaries, the motor generator set being connected to the first named generator, characterized by the fact that condensate from the condenser for the main prime mover is used as cooling liquid in the condenser for the second named prime mover, and the temperature of the condensate of the second named prime mover is automatically kept constant or substantially constant by shifting the load from the second named prime mover driven generator set to the motor generator set and vice versa.

6. A power plant having a main prime mover driven generator set, motor driven auxiliaries, a prime mover driven set and a motor generator set connected in parallel for supplying power to the motors of the auxiliaries, the motor generator set being connected to the first named generator, and condensate from the condenser for the main prime mover being utilized as cooling liquid for the condenser of the second prime mover, characterized by the fact that means are provided for automatically holding substantially constant exhaust pressure on the second prime mover by varying the load thereon, the excess load being carried by the motor generator set.

7. In a power plant, a main prime mover, a generator driven thereby, auxiliaries, motors for driving them, a second prime mover, a generator driven thereby, a motor generator set having its motor connected to the first named generator, means connecting the generator of the motor generator set and the second named generator in parallel to the motors which drive the auxiliaries, a condenser for the main prime mover, a condenser for the second prime mover which utilizes condensate from the first named condenser as cooling liquid, and a movable abutment responsive to the pressure of the second named condenser for automatically regulating the load on the second named prime mover so as to maintain substantially constant vacuum in the second named condenser.

8. In a power plant, a main prime mover, a generator driven thereby, auxiliaries, motors for driving them, a second prime mover, a generator driven thereby, a motor generator set having its motor connected to the first named generator, means connecting the generator of the motor generator set and the second named generator in parallel to the motors which drive the auxiliaries, a condenser for the main prime mover, a hot well, a jet condenser for the second named prime mover having its discharge tube discharging into the hot well, means for taking condensate from the first named condenser and supplying it to said jet condenser where it is used as cooling water, and automatic means for maintaining such a load on the second named prime mover as to hold substantially constant vacuum in the jet condenser.

9. In a power plant, a main prime mover, a generator driven thereby, auxiliaries, motors for driving them, a second prime mover and a motor which is connected to said generator for supplying power to the motors of the auxiliaries, a condenser for the main prime mover, a condenser for the second prime mover which utilizes condensate from the first named prime mover as cooling liquid, and means for automatically dividing the load between the motor and second named turbine so as to maintain substantially constant vacuum in the second named condenser.

In witness whereof I have hereunto set my hand this 13th day of December, 1920.

ARTHUR R. SMITH.